Patented Mar. 7, 1944

2,343,541

UNITED STATES PATENT OFFICE 2,343,541

ADDITION OF FLUOSILICATES TO LATEX

Roswell H. Ewart, Nutley, N. J., assignor to United States Rubber Company, New York, N. Y., a corporation of New Jersey No Drawing. Application December 12, 1940, Serial No. 369,745

9 Claims. (Cl. 260—723)

This invention relates to the addition of fluosilicates to latex, and more particularly to the reduction of local coagulation of latex when fluosilicates are admixed therewith.

The thickening of alkaline latex by the addition of small amounts of fluosilicates, for example, .05 to .2 part of alkali metal fluosilicate per 100 parts of latex solids, and the gelling of latex by the addition of larger amounts of fluosilicates, for example, up to 5 parts of alkali metal fluosilicate per 100 parts of rubber in the latex, is well known, and is described in U. S. Patent 1,994,503. A similar setting of latex to an irreversible gel by means of an alkali metal fluosilicate after conversion of the latex into a foam, and the drying of the thus gelled latex foam to form sponge rubber, is described in U. S. Patent 1,852,447. The gelling or coagulation of alkaline latex by means of alkali metal fluosilicate is the result of the progressive solution and hydrolysis of the slightly soluble fluosilicate, with the consequent liberation of hydrogen ions, which reduces the pH of the latex sufficiently to cause thickening or gelling of the same. The fluosilicate, preferably an alkali metal fluosilicate, and commonly sodium silicofluoride or fluosilicate, may be added to the latex or to latex foam in the form of an aqueous suspension, either concentrated in the form of a paste, for example, a 50% paste, or in dilute fluid condition, for example, as a 10 or 20% suspension, or the like. The pH of such aqueous suspensions of sodium fluosilicate is about 3, and it will be seen that when such a suspension is mixed into latex, and particularly latex foam where only thin films of latex are associated with the fluosilicate suspension, local coagulation of the latex by virtue of the low pH of the fluosilicate suspension will occur before the fluosilicate has had a chance to be evenly distributed throughout the liquid latex, or the foam, as the case may be.

The present invention relates to reducing this local coagulation of a latex when an aqueous fluosilicate suspension is admixed therewith.

According to the present invention, there are incorporated in the fluosilicate suspension which is to be admixed with the latex additional fluoride ions, and this raises the pH of the fluosilicate suspension and reduces local coagulation on addition of the suspension to the latex. Since the hydrogen ions and the fluoride ions in the suspension medium are in equilibrium, the addition of a soluble fluoride so increases the concentration of fluoride ions that the concentration of hydrogen ion is decreased by a large factor, resulting in a considerable raising of the pH. Varying amounts of fluoride may be used depending on the pH to which it is desired to raise the fluosilicate suspension before addition to the latex. The addition of an amount of a fluoride that will give a .02 molal concentration of fluoride ions will raise the pH of an aqueous fluosilicate suspension from around 3 to around 5. A .1 molal concentration of fluoride ions in the aqueous medium of the fluosilicate paste will raise the pH to around 6. A .4 molal concentration of fluoride ions will raise the pH to between 6 and 7. Any greater amount of fluoride ions may be added as desired. It will be seen that the amount of fluoride needed to bring a suspension containing a given weight of fluosilicate to a given pH will depend on the concentration of the suspension, the greater the concentration of the suspension, the less weight of fluoride will be needed. This is because the fluosilicate suspension represents a saturated solution of fluosilicate in equilibrium with an excess of solid fluosilicate; consequently the concentration of dissolved fluosilicate will remain constant and independent of the concentration of the suspension, while the concentration of the added soluble fluoride will decrease with dilution of the suspension. The significance of this is that when the fluosilicate suspension is diluted as by adding it in small amounts to an alkaline latex, the effectiveness of the added soluble fluoride is greatly reduced with the result that the desirable property of the fluosilicate paste, i. e., its ability to bring about gelation of the latex by a lowering in pH, is unimpaired. Any water soluble fluoride salt that will dissociate to give fluoride ions in an aqueous medium may be used to raise the pH of an aqueous suspension of fluosilicate. Alkali metal fluorides are preferred for convenience because of their great solubilities. The use of added soluble fluorides to raise the pH of the silicofluoride paste has the advantage over the use of alkalis such as ammonium or sodium hydroxide for the same purpose that it brings about the desired increase in pH without the formation of soluble silicates which would have a thickening action on the paste.

The present invention is particularly advantageous in the manufacture of sponge rubber from foamed latex, since, when a conventional fluosilicate suspension is added to the foam and mixed therein, large amounts of the suspension at the start of the mixing operation come in contact with very thin films of latex and tend to coagulate the latex locally before the fluosilicate suspension can be evenly distributed throughout the latex foam.

As an example of carrying out the invention, a batch of alkaline latex was whipped up into a foam. To a portion of the foam was added a 50% aqueous paste of sodium silicofluoride. This paste had a pH of 3.2. To another portion of the foam was added a similar 50% aqueous sodium silicofluoride paste with the addition of 4 parts of sodium fluoride per 100 parts of water. This paste had a pH of 6.6. In each of these cases the sodium fluosilicate paste was mixed into the foam by stirring for 2 minutes. The first portion showed lumps of coagula in the foam even after 2 minutes stirring, whereas in the second sample no local coagulation had taken place. Where more dilute pastes are added, a correspondingly larger amount of sodium fluoride must be added to maintain the fluoride ion concentration the same. In this 50% fluosilicate paste, 4 parts of sodium fluoride would be added per 100 parts of sodium fluosilicate. In a 25% aqueous suspension of sodium fluosilicate about 12 parts of sodium fluoride per 100 parts of sodium fluosilicate would be needed to keep the suspension to the same pH. In a 10% aqueous suspension of sodium fluosilicate about 36 parts of sodium fluoride per 100 parts of sodium fluosilicate would keep the pH around 6.6.

It may readily be seen that the addition of fluoride ions to an aqueous suspension of a fluosilicate permits the addition of fluosiliactes to latex without local coagulation, which would otherwise result from the addition to latex of a fluosilicate paste not containing added fluoride ions.

In view of the many changes and modifications that may be made without departing from the principles underlying the invention, reference should be made to the appended claims for an understanding of the scope of the invention.

Having thus described my invention, what I claim and desire to protect by Letters Patent is:

1. A method of reducing local coagulation of an alkaline latex on the addition of an alkali metal fluosilicate thereto which comprises mixing with an alkaline latex an alkali metal fluosilicate suspended in an aqueous medium containing an alkali metal fluoride in sufficient quantity to repress the hydrolysis of the fluosilicate ion.

2. A method of reducing local coagulation of an alkaline latex on the addition of sodium fluosilicate thereto which comprises mixing with an alkaline latex sodium fluosilicate suspended in an aqueous medium containing an alkali metal fluoride in sufficient quantity to repress the hydrolysis of the fluosilicate ion.

3. A method of reducing local coagulation of an alkaline latex on the addition of sodium fluosilicate thereto which comprises mixing with an alkaline latex sodium fluosilicate suspended in an aqueous medium containing sodium fluoride in sufficient quantity to repress the hydrolysis of the fluosilicate ion.

4. In the method of making sponge rubber, the steps comprising forming an alkaline latex composition into an uncoagulated latex foam, and mixing with the foam an aqueous suspension of sodium fluosilicate containing an alkali metal fluoride in sufficient quantity to repress the hydrolysis of the fluosilicate ion, said fluosilicate being at least in amount sufficient to coagulate said foam.

5. In the method of making sponge rubber, the steps comprising forming an alkaline latex composition into an uncoagulated latex foam, and mixing with the foam an aqueous suspension of sodium fluosilicate containing an alkali metal fluoride in sufficient quantity to repress the hydrolysis of the fluosilicate ion, said fluosilicate being at least in amount sufficient to coagulate said foam.

6. In the method of making sponge rubber, the steps comprising forming an alkaline latex composition into an uncoagulated latex foam, and mixing with the foam an aqueous suspension of sodium fluosilicate containing sodium fluoride in sufficient quantity to repress the hydrolysis of the fluosilicate ion, said fluosilicate being at least in amount sufficient to coagulate said foam.

7. Alkaline latex in the form of a foam admixed with an alkali metal fluosilicate and an alkali metal fluoride.

8. Alkaline latex in the form of a foam admixed with sodium fluosilicate and a alkali metal fluoride.

9. Alkaline latex in the form of a foam admixed with sodium fluosilicate and sodium fluoride.

ROSWELL H. EWART.